US011904682B2

(12) United States Patent
Zalewski et al.

(10) Patent No.: US 11,904,682 B2
(45) Date of Patent: Feb. 20, 2024

(54) ELECTRIC VEHICLE HAVING LOW RADIUS TURN CONFIGURATIONS

(71) Applicant: MAGNA POWERTRAIN OF AMERICA, INC., Troy, MI (US)

(72) Inventors: John D. Zalewski, Lake Orion, MI (US); Bradley Ketchel, Oxford, MI (US); Ryan Shaw, Southfield, MI (US)

(73) Assignee: MAGNA POWERTRAIN OF AMERICA, INC., Troy, MI (US)

( * ) Notice: Subject to any disclaimer, the term of this patent is extended or adjusted under 35 U.S.C. 154(b) by 346 days.

(21) Appl. No.: 17/307,012

(22) Filed: May 4, 2021

(65) Prior Publication Data
US 2021/0347257 A1  Nov. 11, 2021

Related U.S. Application Data

(60) Provisional application No. 63/021,138, filed on May 7, 2020.

(51) Int. Cl.
*B60K 17/348* (2006.01)
*B60K 17/356* (2006.01)
*B60K 1/02* (2006.01)
*B60K 1/00* (2006.01)

(52) U.S. Cl.
CPC ............. *B60K 17/348* (2013.01); *B60K 1/02* (2013.01); *B60K 17/356* (2013.01); *B60K 2001/001* (2013.01)

(58) Field of Classification Search
CPC ...... B60K 17/348; B60K 1/02; B60K 17/356; B60K 2001/001
See application file for complete search history.

(56) References Cited

U.S. PATENT DOCUMENTS

| 7,383,910 B2 * | 6/2008 | Mori ................. B60K 23/0808 180/245 |
| 8,701,801 B2 | 4/2014 | Itou et al. |
| 2014/0135170 A1 | 5/2014 | Chess et al. |

FOREIGN PATENT DOCUMENTS

| EP | 1990229 A2 * | 11/2008 | ........... B60K 17/356 |
| WO | WO-2019110198 A1 * | 6/2019 | ............. B60T 11/21 |

\* cited by examiner

*Primary Examiner* — Jacob B Meyer
(74) *Attorney, Agent, or Firm* — Dickinson Wright PLLC

(57) ABSTRACT

An electric vehicle is comprised of a first driveline equipped with a first electric drive axle assembly having a first electric drive module configured to drive a pair of first wheels, a second driveline equipped with a second electric drive axle assembly having a second electric drive module configured to drive a pair of second wheels and a vehicle control system controlling coordinated operation of the first and second electric drive modules to generate tractive drive torque transmitted to the wheels and provide low-radius turning functionality.

9 Claims, 6 Drawing Sheets

ELECTRIC VEHICLE HAVING LOW RADIUS TURN CONFIGURATIONS

CROSS-REFERENCE TO RELATED APPLICATIONS

This U.S. Utility patent application claims the benefit of and priority to U.S. Provisional Patent Application Ser. No. 63/021,138 filed on May 7, 2020, the disclosure of which is incorporated herein by reference in its entirety.

FIELD

The present disclosure relates generally to vehicles powered by an electric drive module. More particularly, the present disclosure is directed to a vehicle comprising a front driveline equipped with a front electric drive axle assembly having a front electric drive module driving a pair of front wheels, a rear driveline equipped with a rear electric drive axle having a rear electric drive module driving a pair of rear wheels, and a vehicle control system for controlling coordinated operation of the front and rear electric drive modules to generate tractive power and provide a low radius turning functionality.

BACKGROUND

This section provide general background information related to electric vehicles and electric powertrain configurations arranged to drive one or more pairs of ground-engaging wheels. However, this background section is not necessarily prior art to the inventive concepts associated with the present disclosure.

The automotive industry is committed to development of alternative powertrains in an effort to reduce exhaust emissions associated with conventional powertrains equipped with an internal combustion engine. Much of the recent development activity has been directed toward electric vehicles (EV) and hybrid electric vehicles (HEV) equipped with one or more electric traction motors powered by electric energy stored in an array of on-board battery packs.

Various alternative electric powertrain configurations are currently under development. For example, electric drive axle assemblies have been developed to replace otherwise convention drive axle assemblies. The electric drive axle assembly is typically configured to include an electric motor, a final drive unit including a differential assembly, a gear reduction unit operably coupling the electric motor to the final drive unit, and a pair of axle shafts interconnecting the differential assembly to a pair of ground-engaging wheels. The electric drive axle assembly further includes an axle housing assembly configured to include a motor housing supporting the electric motor, a differential housing supporting the final drive unit, and a pair of axle tubes supporting the pair of axle shafts. The gear reduction unit can be a lay shaft configuration or a planetary configuration for the purpose of providing a desired speed reduction and torque multiplication between the electric motor and the final drive unit. Thus, the electric drive axle assembly is essentially a single-speed transaxle that is adapted to drive either the front wheels or the rear wheels of the vehicle.

In another electric powertrain configuration, the vehicle is equipped with a pair of wheel-mounted electric drive modules. Each wheel-mounted electric drive module is configured to include a fixed-ratio gear reduction unit that is operable disposed between an electric motor and a rotary wheel hub. As an alternative, the electric drive module can be mounted inboard of the wheel hub and configured with the electric motor and the gear reduction unit driving a corresponding axle shaft which, in turn, drives the wheel hub. In either arrangement, coordinated control of the laterally-spaced pair of electric drive modules via a vehicle control system functions to generate and deliver tractive power to the wheels. In vehicles equipped with such "dual motor" electric powertrain configurations, the vehicle control system provides side-to-side (i.e. "left-to-right") control in either of a front wheel drive (FWD) or a rear wheel drive (RWD) vehicle. Alternative, it is known to use a pair of electric drive modules in cooperation with both the front wheels and the rear wheels to provide four independently-controllable traction motors capable of generating balanced power and traction for both left-to-right and front-to-rear control and to establish a four-wheel drive (4WD) electric powertrain configuration.

In view of such known single-motor and dual-motor electric powertrain configurations, a recognized need exists to develop new electric vehicle powertrain configurations that advance the art and provide optimized power and traction delivery characteristics.

SUMMARY

This section provides a general summary of various inventive concepts embodying the teachings of the present disclosure. Accordingly, the specific embodiments disclosed in this summary section are provided for purposes of illustration and identification only and are not intended to limit the full and fair scope of protection to be afforded to the present disclosure. Further, this section is not intended to be considered an exhaustive and comprehensive listing of all objectives, aspects, features and functions associated with the present disclosure.

It is an objective of the present disclosure to provide alternative electric powertrain configurations for use with electric vehicles and which advance the current state of technology.

In accordance with this objective, it is an aspect of the present disclosure to provide an electric powertrain configuration for an electric vehicle comprised of a front driveline equipped with a front electric drive axle assembly having a front electric drive module configured to drive a pair of front wheels, a rear driveline equipped with a rear electric drive axle assembly having a rear electric drive module configured to drive a pair of rear wheels, and a vehicle control system providing coordinated actuation of the front and rear electric drive modules to generate and transmit tractive power to the front and rear wheels.

It is a related aspect of the present disclosure to coordinate controlled actuation of the front and rear electric drive modules for providing a low radius turning functionality.

It is another related aspect of the present disclosure to control the front and rear electric drive modules for providing a front-wheel drive (FWD) mode of operation via control of the front electric drive module, a rear-wheel drive (RWD) mode of operation via control of the rear electric drive module, and an all-wheel drive (AWD) mode of operation via coordinated control of both the front and rear electric drive modules.

It is yet another related aspect of the present disclosure to configure the front electric drive axle assembly with a front final drive unit having a front differential assembly and a pair of front axle shafts operably connecting the front differential assembly to the front wheels. Additionally, the front electric drive module is operably associated with the front electric drive axle assembly and is configured to include a front electric motor, a front gear reduction unit operably connecting the front electric motor to the front final drive unit, a front differential locker unit operably disposed between the front differential assembly and a first one of the front axle shafts, and a front disconnect unit operably disposed between a second one of the front axle shafts and its corresponding front wheel. The front differential locker unit is operable in a first or "unlocked" state whereat the front differential assembly is open and permits relative rotation between the pair of front axle shafts and is operable in a second or "locked" state whereat the front differential assembly is locked and prevents relative rotation between the pair of front axle shafts. The front disconnect unit is operable in a first or "connected" state whereat the front differential assembly is coupled to drive the front wheel associated with the second one of the front axle shafts and is operable in a second or "disconnected" state whereat the front differential assembly is uncoupled from the front wheel associated with the second one of the front axle shafts.

In accordance with a further related aspect of the present disclosure, the rear electric drive axle assembly is configured with a rear final drive unit having a rear differential assembly and a pair of rear axle shafts operably interconnecting the rear differential assembly with a pair of rear wheels. Additionally, the rear electric drive module is operably associated with the rear electric drive axle assembly and is configured to include a rear electric motor, a rear gear reduction unit operably connecting the rear electric motor to the rear final drive unit, a rear differential locker unit operably disposed between the rear differential assembly and a first one of the rear axle shafts, and a rear disconnect unit operably disposed between a second one of the rear axle shafts and its corresponding rear wheel. The rear differential locker unit is operable in a first or "unlocked" state whereat the rear differential assembly is open and permits relative rotation between the pair of rear axle shafts and is operable in a second or "locked state whereat the rear differential assembly is locked and prevents relative rotation between the pair of rear axle shafts. The rear disconnect unit is operable in a first or "connected" state whereat the rear differential assembly is coupled to drive the rear wheel associated with the second one of the rear axle shafts and is operable in a second or "disconnected" state whereat the rear differential assembly is uncoupled from the rear wheel associated with the second one of the rear axle shafts.

It is a further aspect of the present disclosure to provide the front electric drive module with a front drive module housing unit that is configured to enclose the front electric motor, the front gear reduction unit, the front final drive unit and front differential assembly, the front differential locker unit, and the front disconnect unit. Similarly, it is an aspect of the present disclosure to provide the rear electric drive module with a rear drive module housing that is configure to enclose the rear electric motor, the rear gear reduction unit, the rear final drive unit and the rear differential assembly, the rear differential locker unit, and the rear disconnect unit.

It is another aspect of the present disclosure to configure the first and second electric drive modules to be identical and it is an alternative aspect of the present disclosure to configure the first and second electric drive modules in a mirror-image arrangements.

It is a still further aspect of the present disclosure to align the front wheels for rotation about a front lateral axis and to align the rear wheels for rotation about a rear lateral axis. The first and second electric motors can be configured to be coaxial with the lateral axes or, in the alternative, to be offset in relation to the lateral axes.

In accordance with these and other aspects and objectives, the present disclosure provides an electric vehicle comprising: a first driveline equipped with a first electric drive axle assembly having a first electric drive module configured to drive a pair of first wheels; a second driveline equipped with a second electric drive axle assembly having a second electric drive module configured to drive a pair of second wheels; and a vehicle control system operable to control coordinated actuation of the first and second electric drive modules to generate and transit tractive drive torque to the first and second wheels while providing a low-radius turning functionality.

The first electric drive axle assembly is configured to define a front axle assembly driving a pair of front wheels while the second electric drive axle assembly is configured to define a rear axle assembly driving a pair of rear wheels.

The first electric drive module is configured to include a first electric motor, a first reduction unit driven by the first electric motor, a first differential assembly driven by the first reduction unit, a first power-operated differential locker unit operable in an unlocked state to permit speed differentiation across the first differential assembly and a locked state to prevent speed differentiation across the first differential assembly, and a first power-operated disconnect unit operable in a connected state to connect the first differential assembly to one of the first axle shafts and in a disconnected state to disconnect the first differential assembly from the first axle shaft.

The second electric drive module is configured to include a second electric motor, a second reduction unit driven by the second electric motor, a second differential assembly driven by the second reduction unit, a second power-operated differential locker unit operable in an unlocked state to permit speed differentiation across the second differential assembly and in a locked state to prevent speed differentiation across the second differential assembly, and a second power-operated disconnect unit operable in a connected state to couple the second differential assembly to one of the second axle shafts and in a disconnected state to uncouple the second differential assembly from the second axle shaft.

Further areas of applicability will become apparent from the following detailed description when considered in conjunction with the accompanying drawings. As noted, the aspects and embodiments summarized above are not intended to limit the fair and reasonable scope of protection to be afforded to the inventive concepts of the present disclosure.

DRAWINGS

The drawings described herein are provided for illustrative purposes only and are directed to certain non-limiting embodiments of the present disclosure. Accordingly, the drawings are not intended to limit the fair and reasonable scope of protection afforded to the inventive concepts of the present disclosure. The present disclosure will now be described by way of example and with reference to the attached drawings, wherein:

FIG. 1 is a diagrammatical illustration of an electric powertrain configuration and a vehicle control system associated with an electric vehicle and including a first electric drive axle assembly equipped with a first electric drive module operable for driving a pair of first wheels, and a second electric drive axle assembly equipped with a second electric drive module operable for driving a pair of second wheels, the electric powertrain being constructed in accordance with the teachings of the present disclosure;

Corresponding reference numbers are used throughout the several drawings to illustrate corresponding components and assemblies.

DETAILED DESCRIPTION

Figure 1:
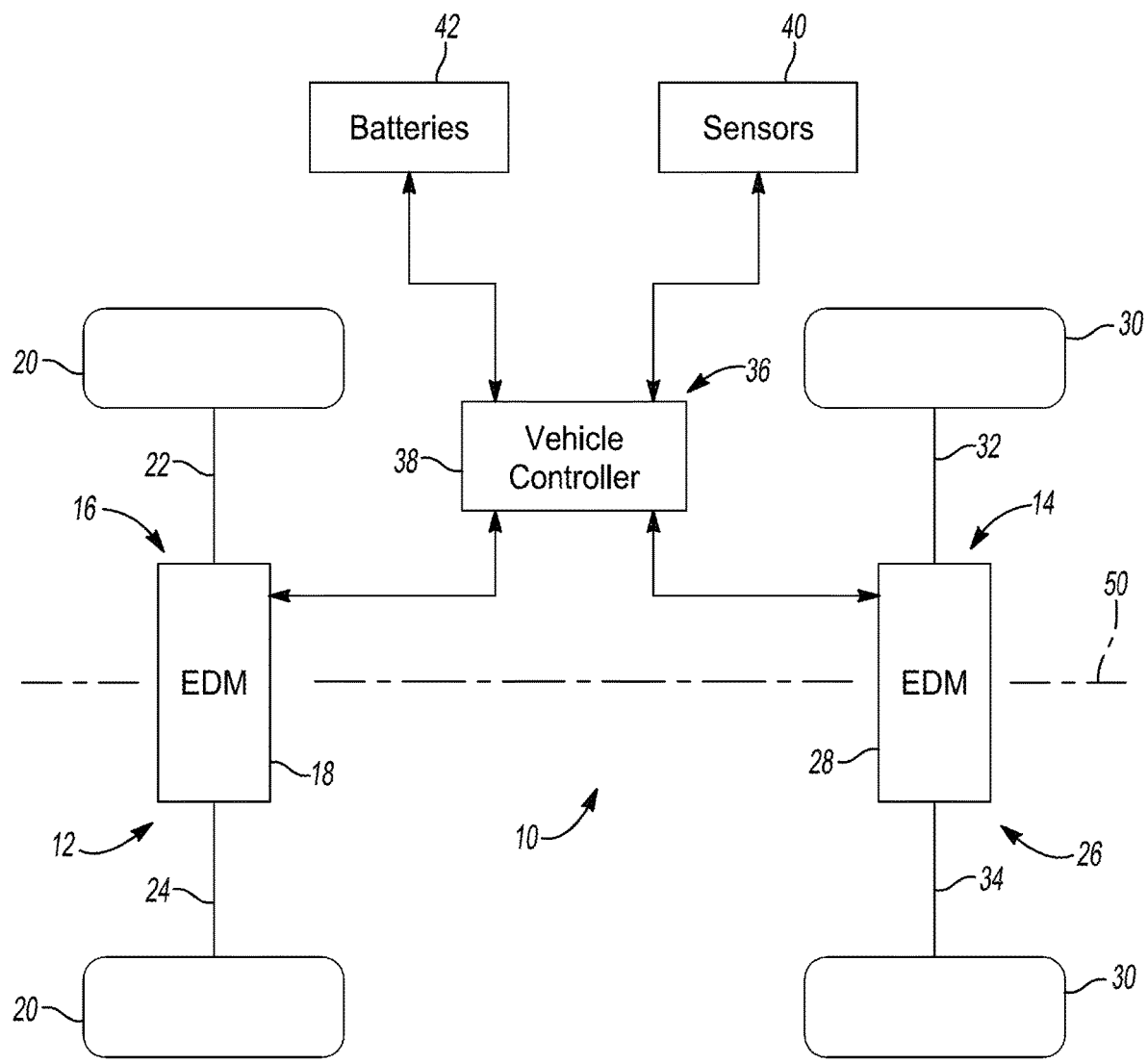

Example embodiments of an electric vehicle equipped with electric drive axle assemblies each having an electric drive axle module are provided so that this disclosure will be thorough and fully convey the scope of the inventive concepts associated with the present disclosure to those who are skilled in the art. Numerous specific details are set forth, such as examples of specific the configuration and functionality of certain component and related methods of operation, to provide a clear understanding of various non-limiting embodiments of the present disclosure. It will be apparent to those skilled in the art that all specific details need not be employed, that example embodiments may be configures in many different forms, and that neither should be construed to limit the scope of the inventive concepts associated with this disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be terms a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the FIGS. is turned over, elements described as "below" or "beneath" other elements or features would then be oriented "above" the other elements or features. Thus, the example term "below" can encompass both an orientation of above and below. The device may be otherwise oriented (rotate 90 degrees or at other orientations) and the spatially relative descriptors used herein interpreted accordingly.

Referring initially to FIG. 1, an exemplary electric powertrain configuration for an electric vehicle 10 is shown schematically to include a first powered driveline 12 and a second powered driveline 14. First powered driveline 12 is shown as a front driveline having a front electric drive axle assembly 16 configured to include a front electric drive module (EDM) 18 operatively coupled to drive a pair of ground-engaging front wheels 20 via a pair of front axle shafts 22 and 24. Second powered driveline 14 is shown as a rear driveline having a rear electric drive axle assembly 26 configure to include a rear electric drive module (EDM) 28 operably coupled to drive a pair of ground-engaging rear wheels 30 via a pair of rear axle shafts 32 and 34. Electric vehicle 10 also includes a vehicle control system 36 which is schematically shown, in this non-limiting configuration, to include a vehicle controller 38, a plurality of vehicle sensors 40 and an array of batteries 42. Vehicle controller 38 is intended to identify and represent one or more electronic control units configured to receive input sensor signals from vehicle sensors 40 and electrical power from batteries 42 and which function cooperatively to control actuation of the electrically-powered devices associated with front EDM 18 and rear EDM 28. Front electric drive axle assembly 16 and rear electric drive axle assembly 26 are shown to be aligned relative to a longitudinal centerline 50 of vehicle 10. In addition, front axle shafts 22 and 24, along with front wheels 20, are aligned for rotation about a first lateral axis while rear axle shafts 32 and 34, along with rear wheels 30 are aligned for rotation about a second lateral axis.

Figure 2:
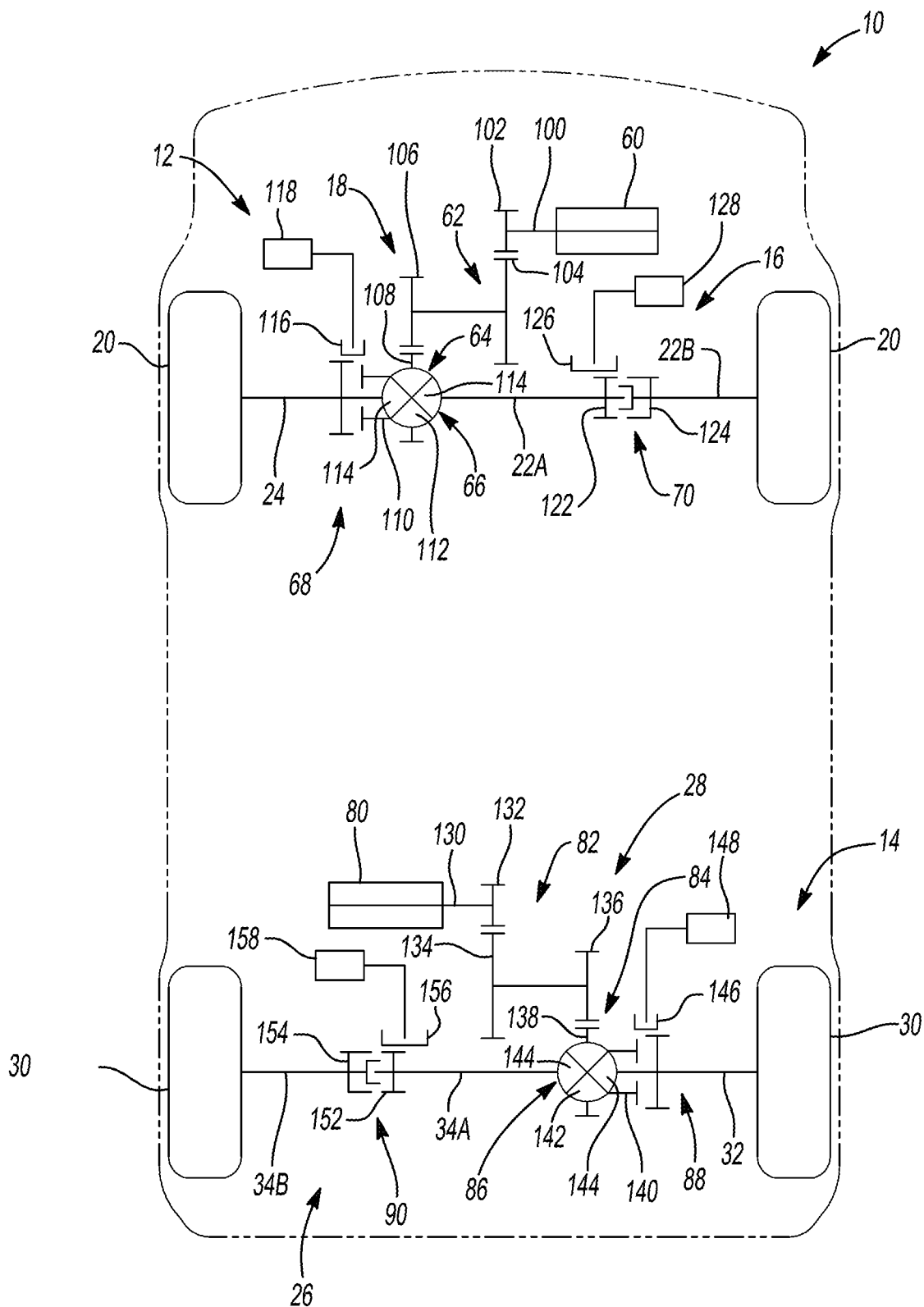
FIG. 2 is a schematic view of the first and second electric drive axle assemblies shown in FIG. 1 and which provides additional details relating to the structure and function of the first and second electric drive modules.

Referring now primarily to FIG. 2, electric vehicle 10 is shown, in accordance with a non-limiting embodiment, as having front electric drive module 18 of front electric drive axle assembly 16 generally configured to include a first electric motor 60, a first gear reduction unit 62, a first final drive unit 64 with a first differential assembly 66, a first differential locker unit 68, and a first axle disconnect unit 70. Similarly, rear electric drive module 28 associated with rear electric drive axle assembly 26 is shown to generally include a second electric motor 80, a second gear reduction unit 82, a second final drive unit 84 with a second differential assembly 86, a second differential locker unit 88, and a second axle disconnect unit 90.

While not expressly shown, it is understood that front electric drive axle assembly 16 would also include a front axle housing assembly comprised of a first EDM housing and a pair of first axle tubes. First EDM housing would enclose and support the components noted above in association with front electric drive module 18 while the first axle tubes would enclose and support front axle shafts 22, 24. Likewise, it will be also understood that rear electric drive axle assembly 26 would include a rear axle housing assembly comprised of a second EDM housing and a pair of second axle tubes. Second EDM housing would enclose and support the components noted above in association with second electric drive module 28 while the second axle tubes would enclose and support rear axle shafts 32, 34.

With continued reference to FIG. 2, a non-limiting embodiment of front electric drive module 18 will now be described in greater detail. In particular, first electric motor 60 is shown to include a first motor shaft 100 driving first gear reduction unit 62 which is shown to include a first gearset and a second gearset. The first gearset includes a first gear 102 driven by first motor shaft 100 and a second gear 104 meshed with and driven by first gear 102. The second gearset includes a third gear 106 connected for common rotation with second gear 104 and a fourth gear 108 meshed with and driven by third gear 106. Fourth gear 108 is also part of first final drive unit 64 and may be configured as a ring gear that is fixed for common rotation with a first differential housing 110 of first differential assembly 66. Thus, rotary power (i.e. drive torque) is transmitted to first differential housing 110 via first gear reduction unit 62 in response to actuation of first electric motor 60. First differential assembly 66 is otherwise conventional and includes at least one pair of first differential pinion gears 112 that are rotatably mounted on first pinion posts (not shown) for rotation with first differential housing 110. First differential pinion gears 112 are each meshed with a pair of first differential side gears 114. One of first differential side gears 114 is fixed for rotation with a first half-shaft portion 22A of front axle shaft 22 which the other one of first differential side gears 114 is fixed for rotation with front axle shaft 24.

First differential locker unit 68 is operably disposed between first differential housing 110 and front axle shaft 24 (or its corresponding differential side gear 114) and is shown schematically to include a moveable first clutch element 116 and a first power-operated locker actuator 118. First powered locker actuator 118 is controlled via vehicle controller 38 and is operable for moving first clutch element 116 between first and second positions. When first clutch element 116 is located in its first position, first differential housing 110 is uncoupled from front axle shaft 24 to define a first or "unlocked" state for first differential assembly 66. In contrast, movement of first clutch element 116 to its second position functions to couple first differential housing 110 to front axle shaft 24 to define a second or "locked" state for first differential assembly 66. With first differential assembly 66 operating in its unlocked state, relative rotation (i.e. speed differentiation) is permitted between front axle shaft 24 and a second half-shaft portion 22B of front axle shaft 22. With first differential assembly 66 operating in its locked state, such relative rotation is prevented. It will be understood that the schematic version shown for first differential locker unit 68 is intended to represent all known differential locking arrangements capable of shifting front differential assembly 66 between its unlocked and locked states.

First axle disconnect unit 70 is generally shown in FIG. 2 to be disposed between first half-shaft portion 22A and second half-shaft portion 22B of front axle shaft 22 and include a first drive hub 122 fixed to second half-shaft portion 22B, a first clutch hub 124 fixed to first half-shaft portion 22A, a first disconnect sleeve 126 supported for rotation with first drive hub 122 and axial movement thereon, and a first power-operated disconnect actuator 128. First powered disconnect actuator 128 is controlled via vehicle controller 38 and is operable for moving first disconnect sleeve 126 between first and second positions. When first disconnect sleeve 126 is located in its first position, it is engaged with first clutch hub 124 to establish a first or "connected" drive state between second half-shaft portion 22B and first half-shaft portion 22A of front axle shaft 22. In contrast, when first disconnect sleeve 126 is located in its second position, it is released from engagement with first clutch hub 124 to establish a second or "disconnected" state whereat second half-shaft portion 22B is uncoupled from first half-shaft portion 22A of front axle shaft 22. First axle disconnect unit 70 is shown schematically and is intended to represent any suitable axle disconnect arrangement operable for selectively shifting between connected and disconnected states.

With continued reference to FIG. 2, a non-limiting embodiment of rear electric drive module 28 will now be described in greater detail. Generally, rear electric drive module 28 is shown to be a mirror-image arrangement in comparison to front electric drive module 18. In particular, second electric motor 80 includes a second motor shaft 130 driving second gear reduction unit 82 and which is shown to include a first gearset and a second gearset. The first gearset includes a first gear 132 driven by second motor shaft 130 and a second gear 134 meshed with and driven by first gear 132. The second gearset includes a third gear 136 connected for common rotation with second gear 134 and a fourth gear 138 meshed with and driven by third gear 136. Fourth gear 138 is also part of second final drive unit 84 and may be configured as a ring gear fixed to drive a second differential housing 140 associated with second differential assembly 86. Thus, rotary power (i.e. drive torque) is transmitted to second differential housing 140 via second gear reduction unit 82 in response to actuation of second electric motor 80. Second differential assembly 86 is conventional and includes at least one pair of second differential pinion gears 142 rotatably mounted on second pinion posts (not shown) for rotation with second differential housing 140. Second differential pinions are each meshed with a pair of second differential side gears 144. One of second side gears 144 is fixed for rotation with a first half-shaft portion 34A of rear axle shaft 34 while the other one of second side gears 144 is fixed for rotation with rear axle shaft 32.

Second differential locker unit 88 is operably disposed between second differential housing 140 and rear axle shaft 32 (or its corresponding second side gear 144) and is schematically shown to include a moveable second clutch element 146 and a second power-operated locker actuator 148. Second powered locker actuator 148 is controlled via vehicle controller 38 and is operable for moving second clutch element 146 between first and second positions. When second clutch element 146 is located in its first position, second differential housing 140 is uncoupled from rear axle shaft 32 to define a first or "unlocked" state for second differential assembly 86. In contrast, movement of second clutch element 146 to its second position functions to couple second differential housing 140 to rear axle shaft 32 to define a second or "locked" state for second differential assembly 86. With second differential assembly 86 operating in its unlocked state, relative rotation between rear axle shaft 32 and a first half-shaft portion 34A of rear axle shaft 34 is permitted. In contrast, with second differential assembly 86 operating in its locked state, such relative rotation between rear axle shafts 32 and first axle half-shaft portion 34A is prevented. Again, it is understood that second locker unit 88 is schematically shown to encompass any suitable arrangement for shifting second differential assembly 86 between its unlocked and locked states.

Second axle disconnect unit 88 is generally shown in FIG. 2 to be disposed between first half-shaft portion 34A and a second half-shaft portion 34B of rear axle shaft 34 and includes a second drive hub 152 fixed to first half-shaft portion 34A, a second clutch hub 154 fixed to second half-shaft portion 34B, a second disconnect sleeve 156 driven by second drive hub 152 and axially moveable thereon between first and second positions, and a second power-operated disconnect actuator 158. Second powered disconnect actuator 158 is controlled by vehicle controller 38 and is operably for moving second disconnect sleeve 156 between its first position whereat it is coupled to second clutch hub 154 to establish a first or "connected" state and its second position whereat it is uncoupled from second clutch hub 154 to establish a second or "disconnected" state. When the connected state is established, first and second half-shaft portions 34A and 34B of rear axle shaft 34 are connected for common rotation. When the disconnected state is established, first and second half-shaft portions 34A and 34B of rear axle shaft 34 are permitted to rotate relative to each other.

Figure 3:
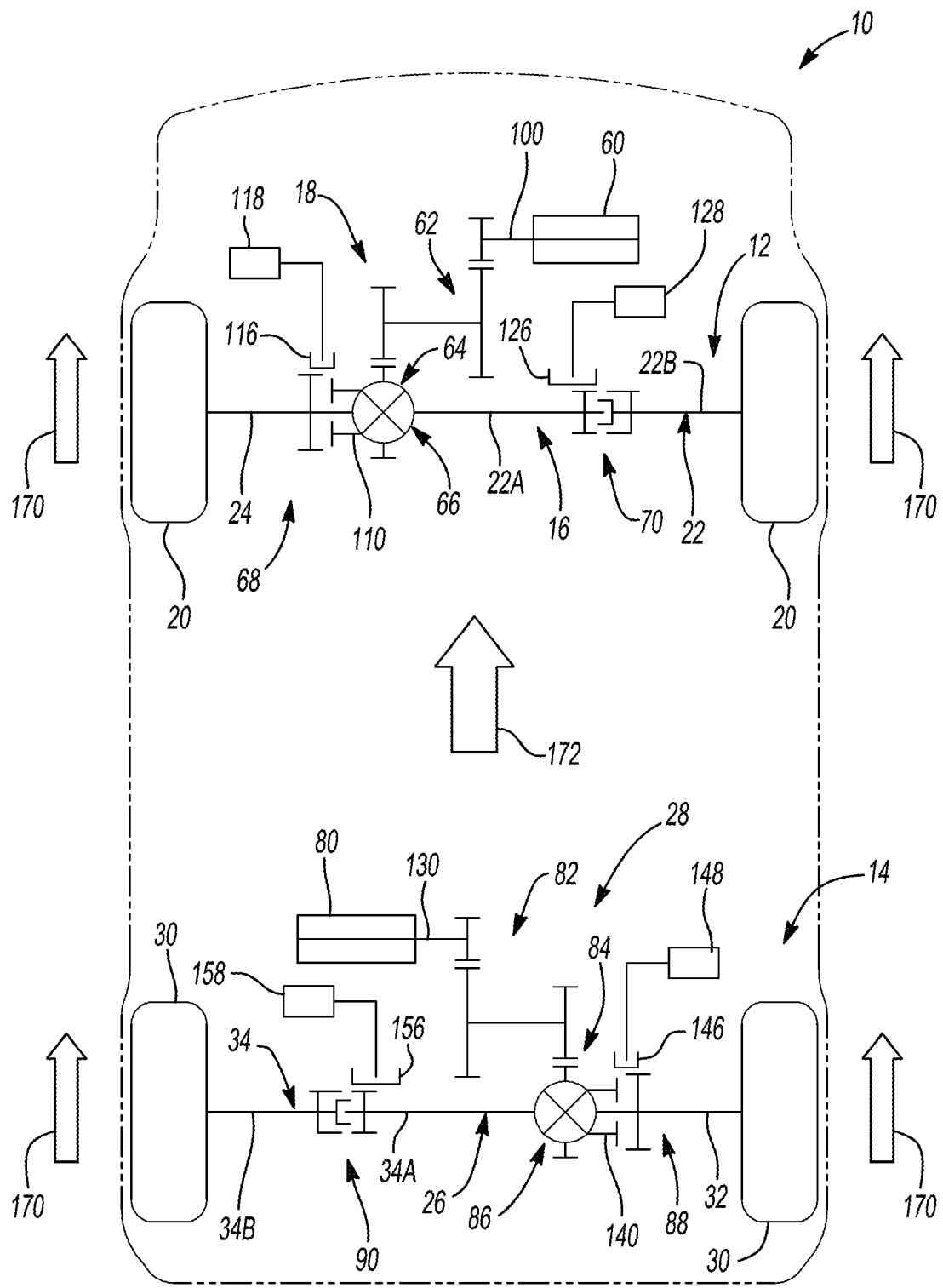
FIG. 3 is generally similar to FIG. 2 and illustrates control of the first and second electric drive modules to establish at least one of a front-wheel drive (FWD), a rear-wheel drive (RWD), and an all-wheel drive (AWD) mode of operation associated with the electric vehicle.

FIG. 3 illustrates the various operating modes available with electric vehicle 10 to provide straight (i.e. forward and reverse) motive operation. A front-wheel drive (FWD) mode for driving electric vehicle 10 is established by first powered driveline 12 generating and transmitting drive torque to front wheels 20. To this end, the FWD mode of vehicle operation is established as follows:

| COMPONENT | STATE |
| --- | --- |
| FIRST MOTOR (60) | ACTUATED |
| FIRST LOCKER UNIT (68) | UNLOCKED OR LOCKED |
| FIRST DISCONNECT UNIT (70) | CONNECTED |
| SECOND MOTOR (80) | NON-ACTUATED |
| SECOND LOCKER UNIT (88) | UNLOCKED OR LOCKED |
| SECOND DISCONNECT UNIT (90) | CONNECTED |

With continued referenced to FIG. 3, a rear-wheel drive (RWD) mode for driving electric vehicle 10 is established by second powered driveline 14 generating and transmitting drive torque to rear wheels 30. The RWD mode of vehicle operation is established as follows:

| COMPONENT | STATE |
| --- | --- |
| FIRST MOTOR (60) | NON-ACTUATED |
| FIRST LOCKER UNIT (68) | UNLOCKED OR LOCKED |
| FIRST DISCONNECT UNIT (70) | CONNECTED |
| SECOND MOTOR (80) | ACTUATED |

-continued

| COMPONENT | STATE |
| --- | --- |
| SECOND LOCKER UNIT (88) | UNLOCKED OR LOCKED |
| SECOND DISCONNECT UNIT (90) | CONNECTED |

Finally, an all-wheel drive (AWD) mode of operation for driving electric vehicle 10 is established by having both front powered driveline 12 and rear powered driveline 14 generate and transmit drive torque to their respective front wheels 20 and rear wheels 30, as follows:

| COMPONENT | STATE |
| --- | --- |
| FIRST MOTOR (60) | ACTUATED |
| FIRST LOCKER UNIT (68) | UNLOCKED OR LOCKED |
| FIRST DISCONNECT UNIT (70) | CONNECTED |
| SECOND MOTOR (80) | ACTUATED |
| SECOND LOCKER UNIT (88) | UNLOCKED OR LOCKED |
| SECOND DISCONNECT UNIT (90) | CONNECTED |

With first differential assembly 66 and second differential assembly 86 functioning in their open (i.e. unlocked) state, inter-axle and intra-axle speed differentiation is permitted between all four wheels (20, 30). However, locking both first and second differential assemblies 66 and 86 together, or independently, provides improved tractive capabilities such as is required during inclement weather and/or poor road conditions. Arrows 170 indicate the individual tractive force at each wheel while Arrow 172 is indicative of the overall tractive force generated by first electric drive module 18 and second electric drive module 28.

Figure 4:
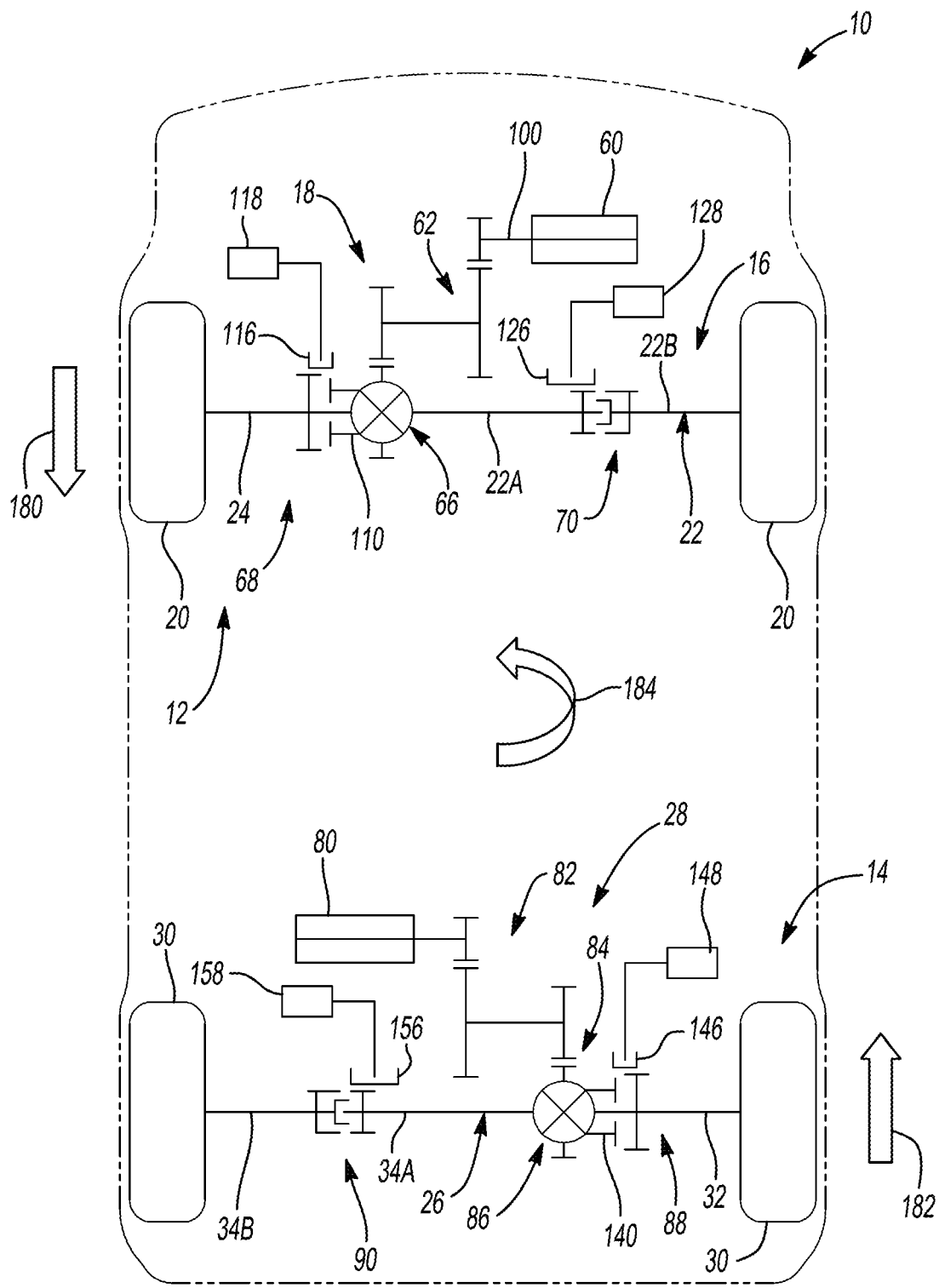
FIG. 4 is also generally similar to FIG. 2 and illustrates control of the first and second electric drive modules for providing a low radius left turn functionality.

Referring now to FIG. 4, control of electric vehicle 10 via vehicle controller 38 to initiate and complete a low-radius turn in a first (i.e. counter-clockwise) direction, commonly referred to as a left turn, will now be described. As seen, first differential locker unit 68 is operating in its locked state and first axle disconnect unit 70 is operating in its disconnected state. Concurrently, second differential locker unit 88 is operating in its locked state and second axle disconnect unit 90 is operating in its disconnected state. Arrow 180 indicates that first electric motor 60 has been actuated to drive first motor shaft 110 in a rotary direction to cause rotation of first left wheel 20 in a reverse direction. First axle disconnect unit 70 operates in its disconnected state to prevent torque from being transferred from the first electric motor 60 to the front right wheel 20. Since first differential locker unit 68 is operating in its locked state, all drive torque generated by first electric drive module 18 is transmitted to front left wheel 20. Arrow 182 indicates that second electric motor 80 has been actuated to drive second motor shaft 130 in a rotary direction to cause rotation of right rear wheel 30 in a forward direction. Second axle disconnect unit 90 operates in its disconnected state to prevent torque transfer from second electric motor 80 to rear left wheel 30. Since second locker unit 88 is operating in its locked state, all drive torque generated by second electric drive module 28 is transmitted to rear right wheel 30. In combination, such control of first electric drive module 18 and second electric drive module 28 generates a moment that is applied to vehicle 10, as indicated by arrow 184. The level of motive power (i.e. output torque) applied via first electric motor 60 and second electric motor 80 will allow vehicle 10 to pivot or turn in a very tight radius.

Figure 5:
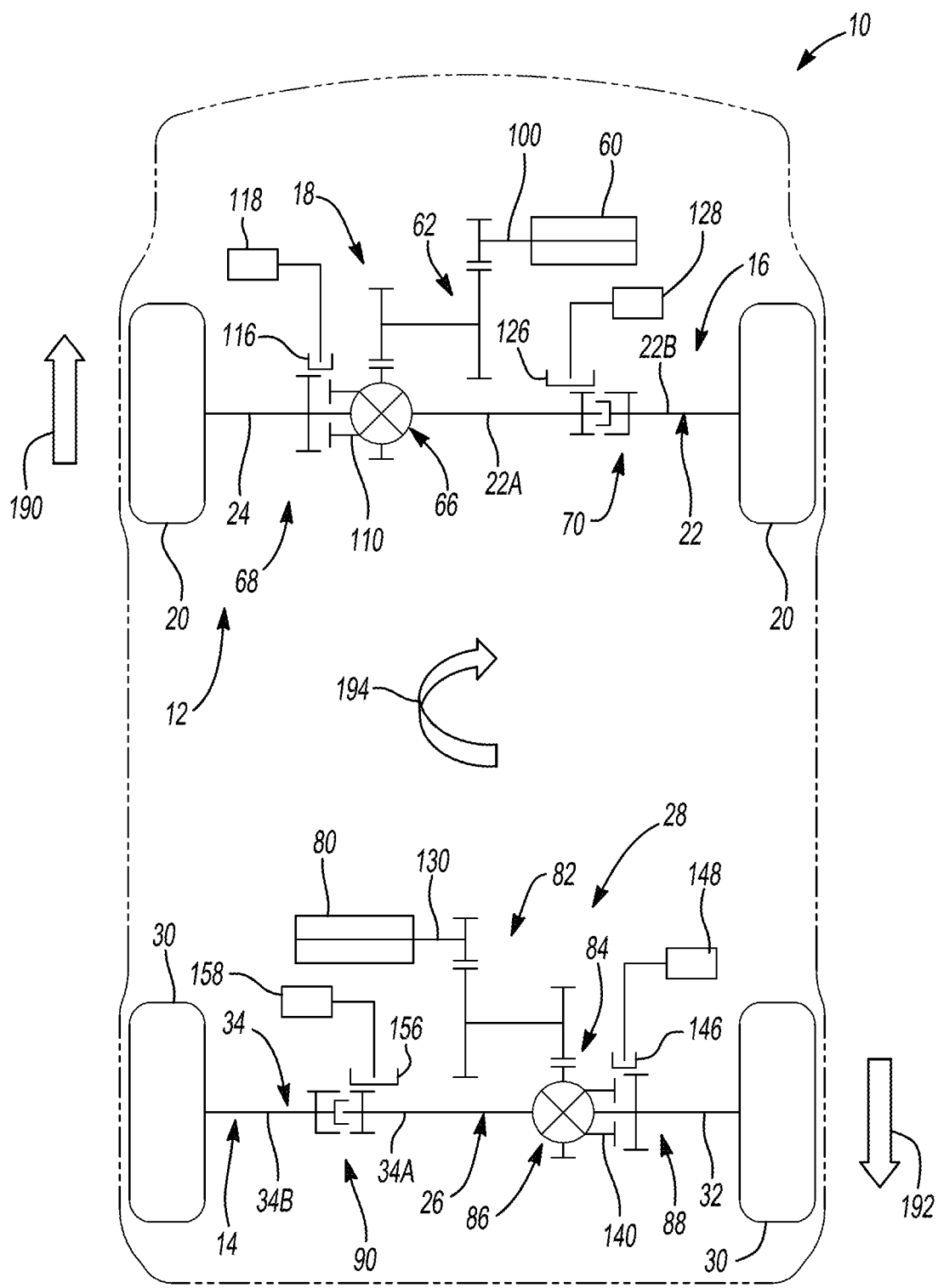
FIG. 5 is also generally similar to FIG. 2 and illustrates control of the first and second electric drive modules for providing a low radius right turn functionality.

Referring to FIG. 5, control of electric vehicle 10 via controller 38 to initiate and complete a low-radius turn in a second (i.e. clockwise) direction, commonly referred to as a right turn, will now be described. In essence, the functional states of first differential locker unit 68 (locked), first axle disconnect unit 70 (disconnected), second differential locker unit 88 (locked), and second axle disconnect unit 90 (disconnected) are identical to that described above in FIG. 4 for the left low-radius turn. However, arrow 190 indicates that first electric motor 60 now functions to rotate first motor shaft 110 in a rotary direction to cause rotation of left front wheel 20 in the forward direction. Likewise, arrow 192 indicates that second electric motor 80 functions to drive second motor shaft 130 in a rotary direction to cause rotation of right rear wheel 30 in the reverse direction. In combination, such control of first electric drive module 18 and second electric drive module 28 generates a moment that is applied to vehicle 10, as indicated by arrow 194, to provide the low-radius right turn functionality.

Figure 6:
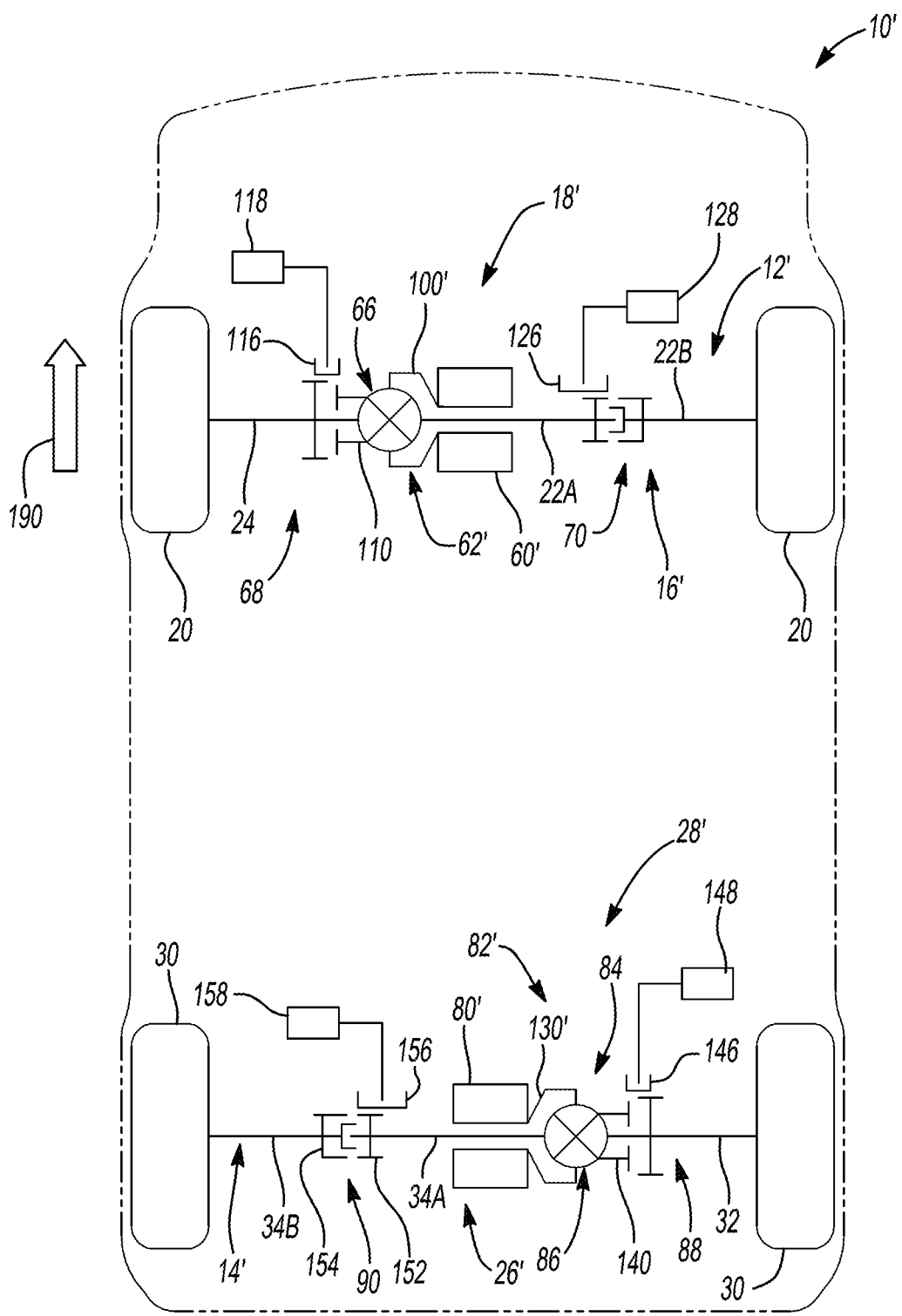
FIG. 6 illustrates first and second electric drive axle assemblies equipped with corresponding first and second electric drive modules constructed in accordance with an alternative embodiment of the present disclosure.

Referring now to FIG. 6, an alternative embodiment of electric vehicle 10' is shown to include a front electric drive axle assembly 16' and a rear electric drive axle assembly 26' equipped with a slightly modified version of first electric drive module 18' and second electric drive module 28', respectively. The primary distinction, in comparison to the laterally-offset configuration shown and described in reference to FIGS. 2-5, is that first electric motor 60' and second electric motor 80' are now coaxially aligned with the respective front and rear lateral rotary axes. First electric motor 60' is shown coaxially surrounding second half-shaft portion 22B of front axle shaft 22, while second electric motor 80' is shown coaxially surrounding first half-shaft portion 34A of rear shaft 34. In addition, first gear reduction unit 62' and second reduction unit 82' can be a planetary configuration or, as an alternative, a single ratio direct connection between the motor output shafts and the differential housings. The function and operation of electric vehicle 10' for forward, reverse and low-radius turning tractive motion is substantially similar to that previously detailed with great specificity for electric vehicle 10.

The present disclosure generally relates to an electric vehicle equipped with single motor drive units located at the front and rear of the vehicle. Each electrically-powered drive unit also includes a gearset driven by the electric motor, a differential assembly driven by the gearset, a power-operated differential locking mechanism and a power-operated axle disconnect mechanism. The electric motor, the differential locking mechanism and the axle disconnect mechanism are actuated via a drive unit control system to permit power flow to both wheels per axle, a single wheel per axle, or neither wheel per axle. This arrangement can achieve very low-radius turns (a/k/a tank turn or tank steer) by configuring each electrically-powered drive unit to drive the opposite corner wheel of the vehicle only and in opposite directions relative to the other. This is achieved by the locking the differential assembly with the locking mechanism and opening the axle disconnect mechanism to allow for only one wheel (per axle) to receive power. By doing the same at the opposite end of the vehicle, only two power wheels are driven, with oppositely directed rotation thereof, causing a low-radius or pivoting of the vehicle about its center.

The foregoing description of the embodiments has been provided for purposes of illustration and description. It is not intended to be exhaustive or to limit the scope of protection afforded to the disclosure. Individual elements or features of a particular mechanism or embodiment are not intended to be limited to that particular mechanism or embodiment but, where applicable, are interchangeable and can be used in alternative embodiments, even if not specifically shown or described. The same may be varied in many ways and such variations are not to be regarded as a departure from the disclosure, but rather contemplated to be included with the fair and reasonable scope of the disclosure.

What is claimed is:

1. An electric vehicle having a pair of laterally-spaced front wheels and a pair of laterally-spaced rear wheels, comprising:
    a front electric drive axle assembly including a first front axle shaft connected to a first front wheel, a second front axle shaft connected to a second front wheel, and a front electric drive module operably disposed between the first and second front axle shafts, the front electric drive module including a front electric motor, a front differential assembly having a front differential input driven by the first electric motor, a first front differential output connected to the first front axle shaft and a second front differential output, a power-operated front differential locker unit, and a power-operated front disconnect unit, wherein the front differential locker unit is operable in an unlocked state to permit the first front differential output to rotate relative to the front differential input and in a locked state to prevent relative rotation between the front differential input and the first front differential output, and wherein the front disconnect unit is operable in a connected state to couple the second front differential output for rotation with the second front axle shaft and in a disconnected state to uncouple the second front differential output from the second front axle shaft;
    a rear electric drive axle assembly including a first rear axle shaft connected to a first rear wheel, a second rear axle shaft connected to a second rear wheel, and a rear electric drive module operably disposed between the first and second rear axle shafts, the rear electric drive module including a rear electric motor, a rear differential assembly having a rear differential input driven by the rear electric motor, a first rear differential output, and a second rear differential output connected to the second rear axle shaft, a power-operated rear differential locker unit, and a power-operated rear disconnect unit, wherein the rear differential locker unit is operable in an unlocked state to permit the second rear differential output to rotate relative to the rear differential input and in a locked state to prevent relative rotation between the rear differential input and the second rear differential output, and wherein the rear disconnect unit is operable in a connected state to couple the first rear differential output for rotation with the first rear axle shaft and in a disconnected state to uncouple the first rear differential output from the first rear axle shaft; and
    a vehicle control system operable for controlling coordinated actuation of the front electric drive module and the rear electric drive module.

2. The electric vehicle of claim 1, wherein a front wheel drive mode of operation is established when the front differential locker unit is operating in either of its unlocked and locked states, the front disconnect unit is operating in its connect state, and the front electric vehicle motor is driven in a first direction for forward tractive motion and in a second direction for reverse tractive motion while the rear electric motor is not driven.

3. The electric vehicle of claim 2, wherein a rear wheel drive mode of operation is established when the rear differential locker unit is operating in either of its locked and unlocked states, the rear disconnect unit is operating in its connected state, and the rear electric motor is driven in a first direction for forward tractive motion and in a second direction for reverse tractive motion while the front electric motor is not driven.

4. The electric vehicle of claim 3, wherein an all-wheel drive mode is established via driving both of the front and rear electric motors in the first direction for forward tractive motion and driving both in the second direction for reverse tractive motion.

5. The electric vehicle of claim 4, wherein a left low-radius turn is generated when the front electric motor is driven in the second direction with the front differential locker unit in its locked state and the front disconnect unit in its disconnected state to transmit drive torque only to the first front wheel in combination with the rear electric motor being driven in the first direction with its rear differential locker unit in its locked state and its rear disconnect unit in its disconnected state to transmit drive torque only to the second rear wheel.

6. The electric vehicle of claim 1, wherein the front electric drive module further includes a front gear reduction unit coupling a front motor shaft of the front electric motor to the front differential input, wherein the rear electric drive module further includes a rear gear reduction unit coupling a rear motor shaft of the rear electric motor to the rear differential input.

7. The electric vehicle of claim 6, wherein the front gear reduction unit and the front electric motor are laterally offset relative to front differential assembly, and wherein the rear gear reduction unit and the rear electric motor are laterally offset relative to the rear differential assembly.

8. The electric vehicle of claim 1, wherein the front differential locker unit includes a front clutch member and a front locker actuator operable to move the front clutch member between a first position whereat the first front differential output is uncoupled from the front differential input to establish the unlocked state and a second positon whereat the front clutch member couples the first front differential output to the front differential input to establish the locked state, wherein the front disconnect unit includes a front disconnect sleeve and a front disconnect actuator operable to move the front disconnect sleeve between a first position whereat the first disconnect sleeve couples the second front differential output to the second front output shaft to establish the connected state and in a second position to uncouple the second front differential output from the second front axle to establish the disconnected state, and wherein actuation of the front locker actuator and the front disconnect actuator is controlled by the vehicle control system.

9. The electric vehicle of claim 8, wherein the rear differential locker unit includes a rear clutch member and a rear locker actuator operable to move the rear clutch member between a first position whereat the second rear differential output is uncoupled form the rear differential input to establish the unlocked state and a second position whereat the rear clutch member couple the second rear differential output to the rear differential input to establish the locked state, wherein the rear disconnect unit includes a rear disconnect sleeve and a rear disconnect actuator operable to move the rear disconnect sleeve between a first position whereat the rear disconnect sleeve couples the first rear differential output to the first rear axle shaft to establish the connected state and a second position to uncouple the first rear differential output from the first rear axle shaft to establish the disconnected state, and wherein actuation of the rear locker actuator and the rear disconnect actuator is controlled by the vehicle control system.

\* \* \* \* \*